United States Patent Office 3,539,621
Patented Nov. 10, 1970

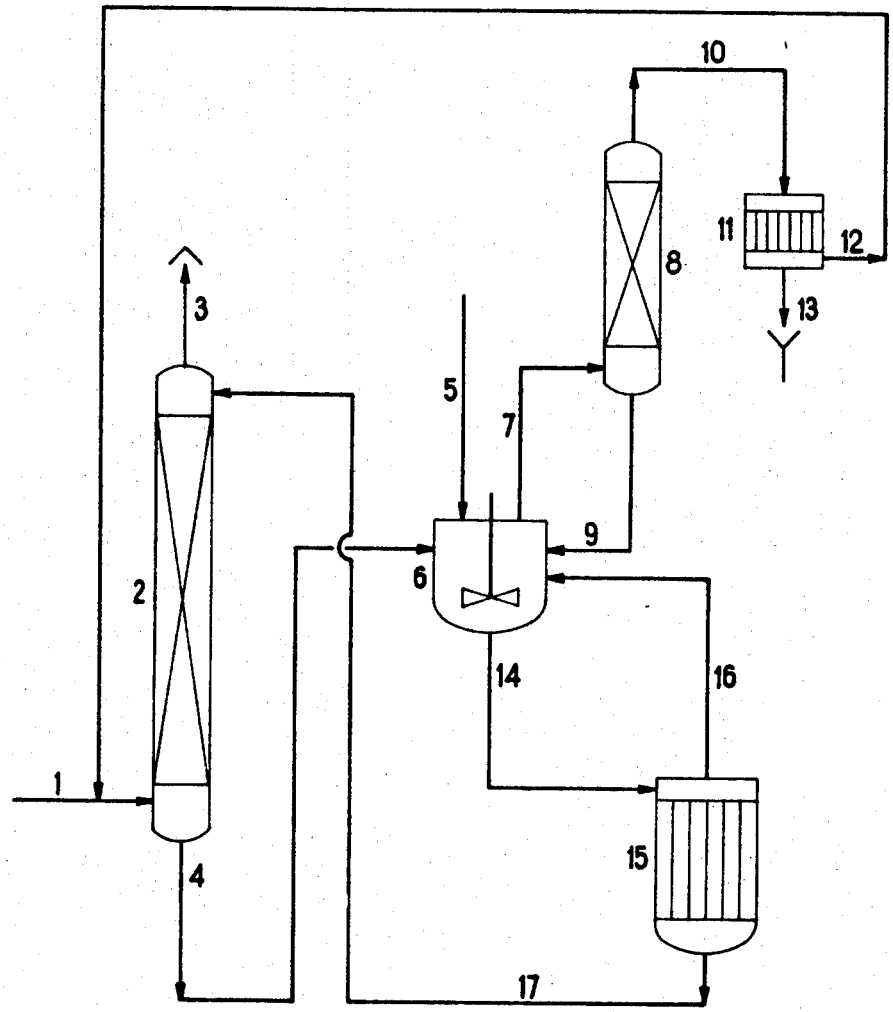

3,539,621
PREPARATION OF ETHYL ESTERS OF UNSATURATED MONOCARBOXYLIC ACIDS FROM ETHYLENE
Rocco Cipollone, Milan, Angelo De Micheli, Saronno, Pietro Ercole, Legnano, and Giancarlo Muratore, Busto Arsizio, Italy, assignors to Montecatini Edison S.p.A., Milan, Italy, a corporation of Italy
Filed Sept. 11, 1967, Ser. No. 666,570
Claims priority, application Italy, Sept. 9, 1966, 20,795/66
Int. Cl. C07c 69/54
U.S. Cl. 260—486      6 Claims

ABSTRACT OF THE DISCLOSURE

Described is a process for the preparation of ethyl esters of unsaturated monocarboxylic acids containing up to 4 carbon atoms. Ethylene is fed into a mixture of ethylsulfuric esters. To the product thus obtained is added an unsaturated monocarboxylic acid of the type R—COOH in which R is an olefin radical containing up to 3 carbon atoms and the ester formed is contemporaneously distilled. The absorption is carried out so that the amount of ethylene combined with sulfuric acid is never lower than an ethylene/sulfuric acid molar ratio of 1.1. The unsaturated monocarboxylic acid is fed in such amount that in the acidolysis the amount of ethylene combined with sulfuric acid is not lowered below the ethylene/sulfuric acid molar ratio of 1.

---

Our invention relates to a process for the continuous preparation of ethyl esters of unsaturated monocarboxylic acids containing up to 4 carbon atoms from ethylene and the corresponding unsaturated acid through the formation of ethyl sulfuric esters.

It is known that it is possible to prepare from olefins and unsaturated carboxylic acids, the corresponding esters. This possibility has not found industrial application, since ethylene, in distinction from higher olefins, gives ethyl esters by reaction with carboxylic acids only under very drastic temperature and pressure conditions. For instance some processes of esterification of ethylene are known in which the reaction is carried out at the temperature of 200–250° C. and under the pressure of 50–150 atm. in the presence of various catalysts (U.S. Pat. 2,174,985). The use of catalysts such as hydrofluoric acid or boron trifluoride (U.S. Pat. No. 2,414,999) or the use of peroxides (U.S. Pat. No. 2,585,723) does not eliminate the inconvenient necessity of operating under high pressures.

The synthesis of ethyl esters by reaction of ethylene with sulfuric acid with the formation of ethyl sulfuric esters followed by successive reaction of these esters with unsaturated mono-carboxylic acids has the following inconvenience: Sulfuric acid tends to add itself to the double bond of the unsaturated monocarboxylic acid with the resulting formation of undesired by-products such as the corresponding oxy- and ethoxy esters, which can hardly be removed from the cycle.

In order to avoid the above inconvenience, French Pat. No. 1,332,186, relating to the synthesis of ethyl acrylate, describes a process in which the ester produced by the reacting solution is removed by a strong current of ethylene and by operating in the presence of water. This expedient however results in very low yields on the ethylene fed, high reaction volumes and therefore low specific potential production of the apparatuses, various difficulties in condensation of the produced ester due to its very low partial pressure in the gases leaving the reactor and more particularly the obtainment of an ester highly impure with acrylic acid and diethyl sulfate.

The process of the present invention makes it possible to overcome all the aforementioned inconvenience without the use of stripping agents. It comprises two essential states: A first step in which ethylene is absorbed on ethylsulfuric esters (reaction 1) and a second step in which the reaction of acidolysis with unsaturated monocarboxylic acid containing up to 4 carbon atoms takes place (reaction 2) in the absence or presence of small amounts of free sulfuric acid.

The main reactions are:

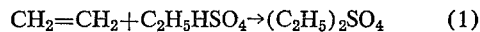
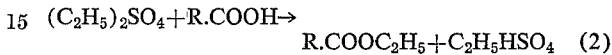

(R is an olefin radical containing up to 3 carbon atoms).

The possible presence of free sulfuric acid must be limited to a minimum in order to avoid the aforementioned inconvenience, namely the formation of undesired side products by addition of sulfuric acid to the double bond of the unsaturated monocarboxylic acid or of the corresponding ester. The absorption is therefore carried out so that the ethylene amount combined with sulfuric acid along the absorption tower is never lower than an ethylene/sulfuric acid molar ratio of 1.1 and the process of acidolysis is carried out with such amounts of unsaturated monocarboxylic acid that the ethylene/sulfuric acid molar ratio is not lowered below 1.

The esterification process can be carried out by operating either continuously or batchwise. The preferred embodiment is the continuous process schematically reported in the simple FIG. 1.

The liquid poor in ethylene, coming from the acidolysis autoclave 6 operating under vacuum is continuously fed through pipe 14 to flash evaporator 15 in which the unsaturated monocarboxylic acid and its ethyl ester are almost completely removed through pipe 16 and recycled to the acidolysis autoclave 6. The evaporation residue is continuously fed through pipe 17 to the top of the absorption tower 2 operating under pressure, to the base of which fresh ethylene is fed through pipe 1. The inert products contained in the ethylene feed are removed from the top of the tower through pipe 3.

From the bottom of the tower the ethylene-rich liquid is continuously drawn through pipe 4 and fed to the acidolysis autoclave 6. The vapors leaving the autoclave through pipe 7 are sent to tower 8. The unsaturated monocarboxylic acid and the sulfuric esters are drawn from the bottom of this tower and through pipe 9 are recycled to the acidolysis autoclave 6. The vapors are withdrawn from the top of the tower and are sent to the low-temperature condenser 11. The ester of the unsaturated monocarboxylic acid containing small amounts of ethyl ether is condensed and drawn through pipe 13. Ethylene present in the vapors, due to the de-absorption caused by the expansion of the liquid from the zone under pressure to the zone under vacuum, is recompressed and recycled to the absorption tower 2 through pipe 12.

The absorption of ethylene is carried out under the conditions of temperature and pressure usually employed for the preparation of ethylsulfuric esters used as intermediates in the preparation of ethyl alcohol, and preferably at 15–40 atm. and at 85–105° C. The amount of ethylene used is such that the ethylene/sulfuric acid molar ratio at the end of the absorption is higher than 1 and preferably from 1.1 to 1.8.

The mixture obtained from the absorption tower prevailingly contains mono- and diethyl-sulfate. This mixture is then sent to the reactor in which the acidolysis process is carried out under vacuum (preferably at 0.05–0.1 kg./cm.$^2$) and 60–120° C. (preferably at 80°–100° C.) with the addition of unsaturated monocarboxylic acid in such amount as not to lower the ethylene amount combined with sulfuric acid below 1 and preferably from 5 to 10 mols of monocarboxylic acid are present per 100 mols of ethylene.

The standing time is preferably 10–60 minutes. The ester of the unsaturated monocarboxylic acid thus formed is contemporaneously distilled while the residue, after optional discharging in order to avoid an increase of side products, such as polymers etc., is recycled to the ethylene absorption with the addition of a monoethylsulfate amount corresponding to the discharged amount.

Ethylene physically dissolved under the temperature and pressure conditions of the absorption tower, is deabsorbed in the expansion of the mixture in the reactor, separated, compressed again and recycled to the absorption. In order to reduce to a minimum the physically absorbed ethylene amount and to render thus useless its recovery, the mixture leaving the absorber can be passed through a prereactor, operating under the same pressure as the absorber, fed with a fraction of unsaturated monocarboxylic acid. In this way the latter is transformed into the corresponding ester at the expense of the ethylsulfates, thus favoring the further absorption of the physically absorbed ethylene amount in the mass coming from the absorber.

In the above way, most of ethylene is chemically combined with sulfuric acid. A preferred way of operating according to our process is described hereinbelow by way of illustration.

EXAMPLE 37 parts by weight of fresh 98% ethylene were fed under 15 atm. at 95° C. through pipe 1 into absorber 2: From the bottom of absorber 2, 2500 parts by weight of the mixture enriched with ethylene were discharged through pipe 4 containing 1.3 mols of combined ethylene per mole of sulfuric acid. From the top, the inert gases contained in ethylene left the absorber through pipe 3. The mixture enriched with ethylene was then fed to the acidolysis reactor 6 together with 80 parts by weight of glacial acrylic acid through pipe 5. The reaction was carried out at 90° C. under an absolute pressure of 0.06 kg./cm.$^2$ for a time of 30 minutes. The ethylacrylate developed in the form of vapor was passed through pipe 7 and was separated by rectification in tower 8 from the entrained acrylic acid and diethylsulfuric ester. Acrylic acid and diethyl sulfate were then recycled to the reactor through pipe 9.

As gaseous current consisting of ethyl acrylate, diethyl ether (formed by action of water, contained in small amounts in acrylic acid on the sulfuric esters) and of ethylene physically dissolved in absorber 2 and deabsorbed during the expansion of the mixture inside reactor 6 was discharged from pipe 10. The ethylene therein was separated from the crude acrylate in the low-temperature condenser 11, recompressed and recycled through pipe 12 to absorption tower 2.

From pipe 13, 108 parts by weight raw ethyl acrylate having a purity of 98% by weight, the rest being prevailingly ethyl ether, were withdrawn. The residual liquid of the acidolysis was fed through pipe 14 to the flash evaporator 15 where it was further impoverished in ethylacrylate and acrylic acid. The vapors leaving the evaporator, operating at a temperature of the heating wall of 115° C. were recycled to reactor 6 through pipe 16.

The residual liquid contains only a few parts or percent by weight of ethyl acrylate and acrylic acid and 1.2 mols of combined ethylene per mole of sulfuric acid present. It is returned to absorber 2 through pipe 17.

We claim:

1. The process for the preparation of ethyl esters of unsaturated monocarboxylic acids containing up to 4 carbon atoms, which comprises feeding ethylene into a mixture of ethylsulfuric esters and absorbing the product thus obtained, with an unsaturated monocarboxylic acid of the type R—COOH wherein R is an olefin radical containing up to 3 carbon atoms, contemporaneously distilling the ester formed, carrying out the absorption so that the amount of ethylene combined with sulfuric acid is at least equal to an ethylene/sulfuric acid molar ratio of 1.1 and feeding the unsaturated monocarboxylic acid in such amount that during the acidolysis the amount of ethylene combined with sulfuric acid is not lowered below the ethylene/sulfuric acid molar ratio of 1.

2. The process of claim 1, wherein R is $CH_2=CH-$, and the acrylic acid used is substantially anhydrous.

3. The process of claim 2, wherein during the absorption an ethylene/sulfuric acid in a molar ratio >1.1 is obtained and during the acidolysis the amount of acrylic acid fed is such that the amount of ethylene combined with sulfuric acid is not lowered below an ethylene/sulfuric acid molar ratio of 1.

4. The process of claim 3, wherein the absorption stage is carried out under a pressure between 15 and 40 atm. and the acidolysis stage at 80–100° C. under a reduced pressure of 0.05–0.1 kg./cm.$^2$ per 10–60 minutes.

5. The process of claim 4, wherein at least a portion of the unsaturated monocarboxylic acid is sent to a prereactor kept under a pressure higher than that of the acidolysis reactor.

6. The process of claim 5, wherein residual liquid of acidolysis before the recycle to the absorption tower, is sent to a flash evaporator under a pressure comprised between 0.05 and 0.1 kg./cm.$^2$ and at a temperature of the heating means between 90° and 150° C., and the vapors are cycled to the acidolysis autoclave.

References Cited

UNITED STATES PATENTS

| 3,403,108 | 9/1968 | Leftin et al. | 252—429 |
| 3,470,230 | 9/1969 | Hirsch et al. | 260—465.3 |

LORRAINE A. WEINBERGER, Primary Examiner

P. J. KILLOS, Assistant Examiner